United States Patent
Vasilyev et al.

(10) Patent No.: US 9,201,160 B2
(45) Date of Patent: Dec. 1, 2015

(54) MEASUREMENT OF DOWNHOLE GAMMA RADIATION BY REDUCTION OF COMPTON SCATTERING

(71) Applicant: Baker Hughes Incorporated, Houston, TX (US)

(72) Inventors: Maxim Vasilyev, The Woodlands, TX (US); Toyli Anniyev, The Woodlands, TX (US); Freddy E. Mendez, Kingwood, TX (US); John M. Longo, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 46 days.

(21) Appl. No.: 14/076,054

(22) Filed: Nov. 8, 2013

(65) Prior Publication Data

US 2015/0129754 A1    May 14, 2015

(51) Int. Cl.
*G01V 5/06* (2006.01)
*G01V 5/10* (2006.01)

(52) U.S. Cl.
CPC . *G01V 5/06* (2013.01); *G01V 5/101* (2013.01)

(58) Field of Classification Search
CPC ................................. G01V 5/06; G01V 5/101
See application file for complete search history.

(56) References Cited

U.S. PATENT DOCUMENTS

| | | | |
|---|---|---|---|
| 3,633,030 A * | 1/1972 | Antkiw et al. | 250/261 |
| 4,841,153 A * | 6/1989 | Wormald | 250/390.04 |
| 5,600,144 A | 2/1997 | Worstell | |
| 5,753,917 A | 5/1998 | Engdahl | |
| 7,309,857 B2 | 12/2007 | Gardner | |
| 8,101,919 B2 | 1/2012 | Madden et al. | |
| 8,212,220 B2 | 7/2012 | Lerch et al. | |
| 8,384,016 B2 | 2/2013 | Ramsden | |

(Continued)

FOREIGN PATENT DOCUMENTS

| EP | 0667539 A1 | 8/1995 |
|---|---|---|
| WO | 2004092719 A2 | 10/2004 |
| WO | 2009111783 A2 | 9/2009 |

OTHER PUBLICATIONS

Hoogenboom, A.M., "A New Method in Gamm-Ray Spectroscopy: a Two Crystal Scintillation Spectrometer With Improved Resolution," Nuclear Instruments 3, pp. 57-68 (Aug. 1958), <doi:10.1016/0369-643X (58) 90092-6>.

(Continued)

*Primary Examiner* — Constantine Hannaher
(74) *Attorney, Agent, or Firm* — Mossman Kumar & Tyler PC

(57) ABSTRACT

Systems, methods and devices for evaluating an earth formation intersected by a borehole. The method includes using a first radiation responsive component to detect gamma rays having an energy below a threshold energy; using a second radiation responsive component configured to detect gamma rays that traverse the first radiation responsive component; generating a reduced-Compton gamma ray spectrum by generating an anticoincidence gamma ray spectrum indicative of the gamma rays detected by the first radiation responsive component and the gamma rays detected by the second radiation responsive component. The anticoincidence gamma ray spectrum represents those gamma rays of the gamma rays detected by the second radiation responsive component that are not detected in coincidence with the gamma rays detected by the first radiation responsive component.

19 Claims, 6 Drawing Sheets

(56) References Cited

U.S. PATENT DOCUMENTS

| | | | |
|---|---|---|---|
| 8,450,692 | B2 | 5/2013 | Siegel |
| 8,455,812 | B2 | 6/2013 | Nikitin et al. |
| 2005/0127282 | A1 | 6/2005 | Grau et al. |
| 2008/0251728 | A1* | 10/2008 | Madden et al. ............... 250/367 |
| 2010/0017134 | A1 | 1/2010 | Steinman et al. |
| 2010/0090115 | A1 | 4/2010 | Lerch et al. |
| 2010/0268074 | A1 | 10/2010 | Van Loef et al. |
| 2012/0043467 | A1 | 2/2012 | Gueorguiev et al. |
| 2012/0074326 | A1 | 3/2012 | Pausch et al. |
| 2012/0126106 | A1 | 5/2012 | Zhou et al. |
| 2012/0132814 | A1 | 5/2012 | Weinberg |
| 2012/0145913 | A1 | 6/2012 | Feller et al. |

OTHER PUBLICATIONS

Muhlberger, Curran D., "Coincidence Techniques for Probing the Interaction of Gamma Rays With Sodium Iodide Crystals," Dept. of Physics, Cornel Univ., pp. 1-7 (Feb. 2009), http://pages.physics.cornell.edu/~cmuhlberger/documents/phys6510-report-n12.pdf.

Farsoni, Abi T., et al., "Design and Modeling of a Compton-Suppressed Phoswich Detector for Radioxenon Monitoring," 2010 Monitoring Research Review: Ground-Based Nuclear Explosion Monitoring Technologies, Oregon State Univ. (2010), LA-UR-10-05578, vol. 2, 2010, pp. 595-603. The 32th Monitoring Research Review. Orlando, Fl, Sep. 21-23, 2010.

Farsoni, Abi T., et al., "Preliminary Measurements with a Compton-Suppressed Phoswich Detector," 2011 Monitoring Research Review: Ground-Based Nuclear Explosion Monitoring Technologies, Oregon State Univ. (2011), The 33th Monitoring Research Review. Tucson, AZ, Sep. 12-15, 2011.

Int'l Search Report and Written Opinion in PCT/US2014/064384, mailed Mar. 10, 2015.

* cited by examiner

MEASUREMENT OF DOWNHOLE GAMMA RADIATION BY REDUCTION OF COMPTON SCATTERING

FIELD OF THE DISCLOSURE

In one aspect, this disclosure generally relates to borehole logging methods and apparatuses for estimating at least one parameter of interest relating to a volume of matter using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are typical regularly occurring naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation present in the near-borehole environment during measurement. This response may then be used to estimate a parameter of interest of the volume. In nuclear logging, additional radioactive isotopes may be generated by providing radiation (e.g., neutron bombardment) to the formation.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation. A rigid or non-rigid carrier may also provide communication channels for sending information up to the surface.

SUMMARY OF THE DISCLOSURE

In aspects, the present disclosure is related to methods of estimating a parameter of interest of a formation using radiation detected from a subterranean formation.

One embodiment according to the present disclosure may be an apparatus for evaluating an earth formation intersected by a borehole. The apparatus may include a first radiation responsive component configured to detect gamma rays; a second radiation responsive component configured to detect gamma rays that traverse the first radiation responsive component; and a processor configured to: generate a reduced-Compton gamma ray spectrum by generating an anticoincidence gamma ray spectrum responsive to the gamma rays detected by the first radiation responsive component and the gamma rays detected by the second radiation responsive component, wherein the anticoincidence gamma ray spectrum is indicative of those gamma rays of the gamma rays detected by the second radiation responsive component that are not detected in coincidence with the same gamma rays detected by the first radiation responsive component. The processor may be further configured to: generate a full gamma ray spectrum indicative of the gamma rays detected by the second radiation responsive component; generate a coincidence spectrum indicative of those gamma rays of the gamma rays detected by the second radiation responsive component that are detected in coincidence with the same gamma rays detected by the first radiation responsive component; and generate the anticoincidence gamma ray spectrum by subtracting the coincidence spectrum from the full spectrum.

The at least one processor may be further configured to estimate at least one parameter of interest using the reduced-Compton gamma ray spectrum. The at least one processor may be further configured to deconvolve the reduced-Compton gamma ray spectrum into a plurality of elemental spectral yields using a plurality of standard spectra. The reduced-Compton gamma ray spectrum may span a continuous energy range including photo peaks at characteristic energies associated with the respective ones of the plurality of standard spectra. The parameter of interest may be the concentration of at least one chemical element in the formation. The first radiation responsive component and the second radiation responsive component may be configured such that the second radiation responsive component detects gamma rays with a higher detection efficiency than the first radiation responsive component. The gamma rays may be emitted from naturally occurring radionuclides.

The first radiation responsive component may be formed at least partially of a material that produces first light scintillations in response to incident gamma rays; and the second radiation responsive component may be formed at least partially of a material that produces second light scintillations in response to incident gamma rays.

The apparatus may include a light isolation component to substantially isolate the second radiation responsive component from first light scintillations and isolate the first radiation responsive component from second light scintillations, the light isolation component comprising one of (i) an isolator, and (ii) a treatment applied to at least one of the first radiation responsive component and the second radiation responsive component. The apparatus may also include at least one light responsive device configured to produce an output representative of the first light scintillations and the second light scintillations. The output of the at least one light responsive device may include a parametric difference between the first light scintillations and the second light scintillations. The at least one light responsive device comprises a first light responsive device configured to produce an output in response to detection of the first light scintillations; and a second light responsive device configured to produce an output in response to detection of the second light scintillations.

Another embodiment according to the present disclosure may be a method of evaluating an earth formation intersected by a borehole. Method embodiments include using a first radiation responsive component to detect gamma rays; using a second radiation responsive component to detect gamma rays that traverse the first radiation responsive component; and generating a reduced-Compton gamma ray spectrum by generating an anticoincidence gamma ray spectrum responsive to the gamma rays detected by the first radiation responsive component and the gamma rays detected by the second radiation responsive component, wherein the anticoincidence gamma ray spectrum is indicative of those gamma rays of the gamma rays detected by the second radiation responsive component that are not detected in coincidence with the gamma rays detected by the first radiation responsive component. Methods may include generating a full gamma ray spectrum indicative of the gamma rays detected by the second radiation responsive component; generating a coincidence spectrum indicative of those gamma rays of the gamma rays detected by the second radiation responsive component that are detected in coincidence with the same gamma rays detected by the first radiation responsive component; and generating the anticoincidence gamma ray spectrum by subtracting the coincidence spectrum from the full spectrum.

Another embodiment according to the present disclosure may be an apparatus for estimating a parameter of an earth formation, comprising: a processor; a subsystem non-transitory computer-readable medium; and a program stored by the non-transitory computer-readable medium comprising instructions that, when executed, cause the processor to perform methods described herein.

Another embodiment according to the present disclosure may be a non-transitory computer-readable medium product for estimating at least one parameter of interest of a volume of an earth formation from information relating to measurements from an apparatus in a borehole of the volume including a first radiation responsive component configured to detect gamma rays and a second radiation responsive element configured to detect gamma rays that traverse the first radiation responsive element, comprising: instructions disposed on the medium that, when executed by a processor, cause the at least one processor to: generate a reduced-Compton gamma ray spectrum by generating an anticoincidence gamma ray spectrum from information indicative of the gamma rays detected by the first radiation responsive element and the gamma rays detected by the second radiation responsive element, wherein the anticoincidence gamma ray spectrum is indicative of those gamma rays of the gamma rays detected by the second radiation responsive element that are not detected in coincidence with the same gamma rays detected by the first radiation responsive element.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
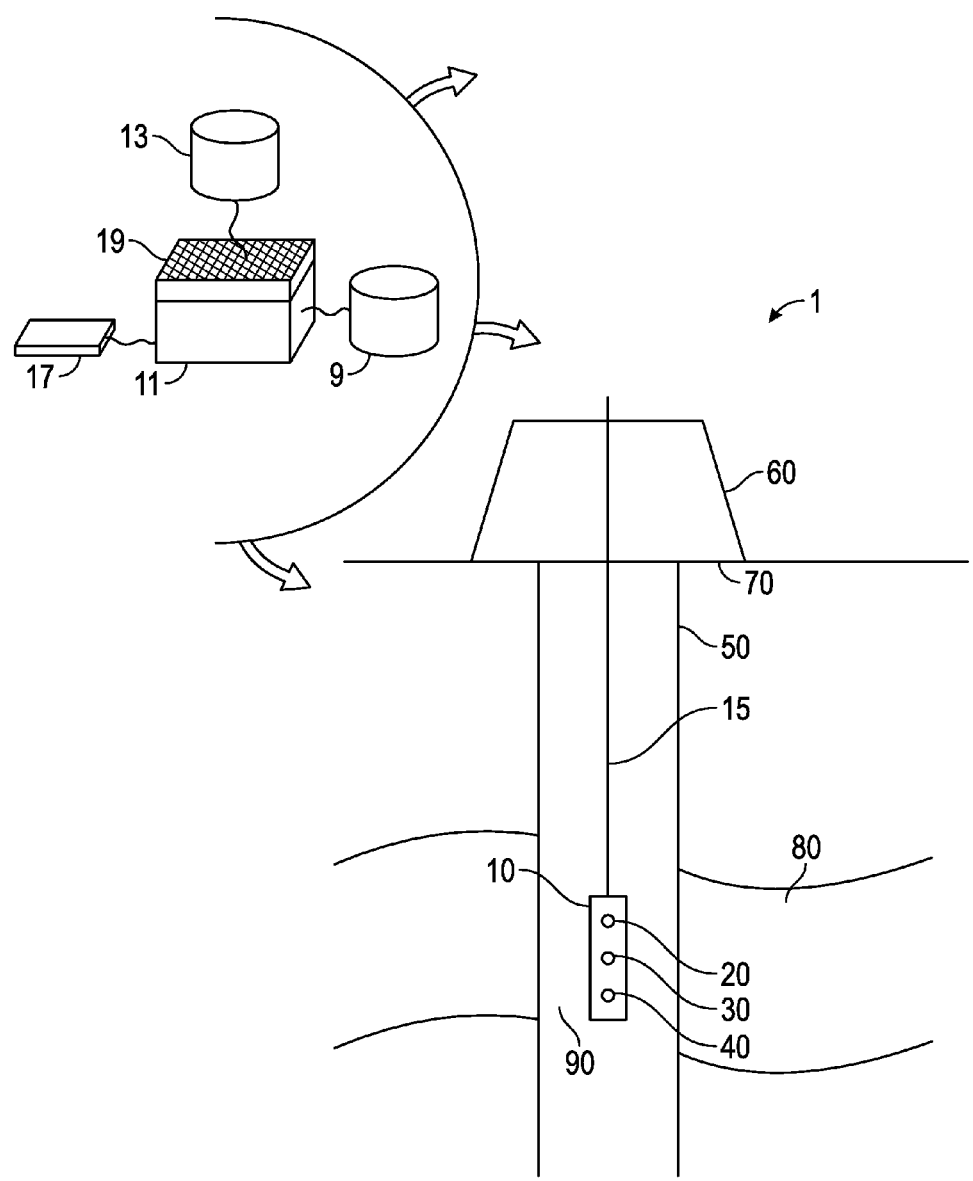
FIG. 1 schematically illustrates a drilling system in accordance with embodiments of the present disclosure.

In aspects, this disclosure relates to using a downhole tool to detect radiation from a subterranean formation. In other aspects, this disclosure relates to estimating a parameter of interest of a subterranean formation from detected radiation. Illustrative methods for estimating a parameter of interest may include the acquisition and utilization of information characterizing gamma rays detected at a single detector. In many instances, the information used for these estimations may be acquired by tools deployed into a wellbore intersecting one or more formations of interest. For context, an exemplary system for deploying and using such tools to acquire this information is described below. Each of these aspects may be referred to generally as investigation of the formation.

In some embodiments, the detectors may detect radiation from naturally occurring radionuclides. In other embodiments, the formation may be exposed to energy from a radiation source. Downhole tools may include this radiation source and one or more detectors. Herein, the radiation source may include, but is not limited to, one or more of a neutron source, and a gamma-ray source. The detectors may be used to detect radiation from the formation, though the detectors are not limited to detecting radiation of the same type as emitted by the radiation source. Detectors may include at least one radiation responsive component, such as a scintillation media (e.g., bismuth germanium oxide ('BGO')) or a semiconductor material (e.g., gallium nitride); and at least one output device generating information in response to detections in the radiation responsive component. Detectors may have shielding to prevent the counting of radiation from unintended sources.

The energy spectrum caused by radioactive decay of radionuclides may be used to estimate parameters of interest of an earth formation. The energy spectrum may be expressed in terms of magnitude (e.g., gamma ray counts per period of time) as a function of energy. The radioactive decay of radionuclides may produce nuclear radiation that may be detected by radiation detectors, as described above. Radionuclides may include naturally occurring radionuclides, such as potassium-40, and the uranium and thorium series, which exist in the earth formation and activated radionuclides, which may include radionuclides activated from the irradiation of nuclides with nuclear radiation.

One or more nuclear radiation detectors disposed along the downhole tool may be configured to generate a response indicative of the nuclear radiation detected. The detected nuclear radiation may include gamma rays. The detected nuclear radiation may be expressed as an energy spectrum (the "response spectrum"). Response spectrum refers to not only the response spectrum as originally acquired, but also after filtering, corrections, or pre-processing is applied. Since the energy spectrum may include energy spectrum components from multiple radionuclides, the nuclear radiation information may be separated to identify the energy spectrum components contained with the energy spectrum.

The separate energy spectrum components may be used for estimating the concentration of at least one radionuclide in the volume of interest of the earth formation. The estimated concentration of the at least one radionuclide may be used for estimating at least one parameter of interest of the volume of interest of the earth formation. A description for some embodiments estimating the at least one parameter of interest follows below. The estimation may be performed in multiple stages, such that an earlier stage may process the information for a later stage. One of the stages may include a technique of elemental standards-based spectral decomposition (also known as a yields method).

Elemental standards-based spectral decomposition may use a combination of reference spectra, with each reference spectrum multiplied by a respective weighting coefficient. Typically a reference spectrum is included for each element of interest (e.g., an element the concentration of which is desired to be known), or for each element producing significant radiation. Each reference spectrum represents a response curve corresponding to radiation attributable to a particular sample element (e.g., uranium). Deconvolution may be linear or non-linear, and may be carried out on the response spectrum holistically without energy windows (i.e., "windowlessly"). These coefficients may be used to determine the portion of the matter of the volume constituted by the sample element. The response spectrum may be measured over a wide range of energies, resulting in improved estimation of the parameter of interest. For example, the response spectrum may span a continuous energy range including gamma ray photo peaks at characteristic energies associated with respective elements for all of the sample elements.

The standard spectra may be derived from analysis of the samples in a laboratory or on-site, or may be modeled standards—that is, standards derived using a variety of numerical, simulated, statistical, or other software-based techniques (e.g., Monte Carlo techniques), which may be obtained using a variety of methods. In one example, gamma ray measurement of a sample may provide a response spectrum to be used as the reference spectrum ('standard') for that element.

However, measurements in the borehole also contain surplus information of other properties of the measured volume. This borehole information can mask element information in lower amplitudes of the response spectrum. For example, elements having a low energy or present in low concentrations may be masked. For example, differences in the borehole environment may change the interactions of gamma rays with the matter of the volume. These interactions may include Compton scattering. Compton scattering effects (which occur for each photo peak) may be particularly prominent in the intermediate energy range, i.e., 100 keV to 10 MeV. Because these interactions affect the response spectrum, the magnitude of the effects in the measured spectrum and in the reference spectrum is different. The difference between the response spectrum and the linear combination (weighted sum) of the 'standards' may be attributed to the difference between the Compton scattering of the rock and of the standards. Aspects of this disclosure relate to compensating for the effects of the borehole environment, as described herein.

The formation typically has a relatively large size, and often comprises elements having an atomic number (Z) that is ideal for gamma rays to experience significant Compton scattering events. Additionally, the relatively limited size of scintillator crystals used for gamma ray detection reduces the probability of photoelectric absorption and increases the relative probability of Compton scattering detection. As a result, the spectra of deposited energy in scintillation media-registered events migrate from under the photoelectric absorption peak ('photopeak') towards the lower energies, creating a relatively large Compton continuum at intermediate and low energies. This continuum renders detection of the presence of NGR photopeaks at energies below approximately 1000 KeV extremely difficult. In turn, this deficiency renders the correct identification of the U-238 and Th-232 families of peaks, as well as the correct calculation of their absolute concentrations in the formation, quite problematic.

The same problem caused by significant contribution of gamma ray counts attributable to the Compton continuum (as much as approximately ⅔ of the total counts) can also complicate the detection of characteristic gamma radiation in the low energy part of gamma spectra from neutron capture events. Low energy gamma rays that have already experienced Compton scattering inside the formation are lacking in information about the isotopes they have originated from. Thus, scrubbing the response spectra of the effects of such gamma rays is desirable.

General embodiments in accordance with the invention may include systems, methods and devices for evaluating an earth formation intersected by a borehole. The method may include using a first radiation responsive component to detect gamma rays traveling through the component; using a second radiation responsive component configured to detect gamma rays that traverse the first radiation responsive component; and generating a reduced-Compton gamma ray spectrum by generating an anticoincidence gamma ray spectrum indicative of the gamma rays detected by the first radiation responsive component and the gamma rays detected by the second radiation responsive component. The anticoincidence gamma ray spectrum is indicative of those gamma rays of the gamma rays detected by the second radiation responsive component that are not detected in coincidence with the gamma rays detected by the first radiation responsive component. The reduced-Compton gamma ray spectrum improves accuracy by removing Compton scattering events from the total energy spectrum.

Also disclosed are borehole investigation methods and apparatuses for estimating formation properties using nuclear radiation, particularly an apparatus and method for estimating parameters of a formation. The method may include using gamma ray count rate information from a detector to measure matrix elements, or other parameters of interest. The apparatus includes a processor and storage subsystem with a program that, when executed, implements the method.

FIG. 1 schematically illustrates a drilling system 1 having a downhole tool 10 configured to acquire information for estimating density or another parameter of interest of a formation 80. The tool 10 may contain sensors for detecting radiation, or detectors 20, 30. Sensors 20, 30 may each detect one or more parameters of a formation. In one illustrative embodiment, the tool 10 may also contain a radiation source 40. Parameters of a formation may include information relating to a geological parameter, a geophysical parameter, a petrophysical parameter, and/or a lithological parameter. Thus, the sensors 20, 30 may include sensors for estimating formation resistivity, dielectric constant, the presence or absence of hydrocarbons, acoustic density, bed boundary, formation density, nuclear density and certain rock characteristics, permeability, capillary pressure, and relative permeability.

The system 1 may include a conventional derrick 60 erected on a derrick floor 70. A conveyance device (carrier 15) which may be rigid or non-rigid, may be configured to convey the downhole tool 100 into wellbore 50 in proximity to formation 80. The carrier 15 may be a drill string, coiled tubing, a slickline, an e-line, a wireline, etc. Downhole tool 10 may be coupled or combined with additional tools (e.g., some or all the information processing system of FIG. 10). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment. The carrier 15 may include a bottom hole assembly, which may include a drilling motor for rotating a drill bit.

In embodiments, the radiation source 40 emits radiation (e.g., neutrons) into the formation to be surveyed. In one embodiment, the downhole tool 10 may use a pulsed neutron generator emitting 14.2 MeV fast neutrons as its radiation source 40. The use of 14.2 MeV neutrons from a pulsed neutron source is illustrative and exemplary only, as different energy levels of neutrons may be used. In some embodiments, the radiation source 40 may be continuous. In some embodiments, the radiation source 40 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

The detectors 20, 30 provide signals that may be used to estimate the radiation counts (e.g., gamma ray counts or neutron counts) returning from the formation. Generally, detectors 20, 30 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 30 may be a short spaced detector, and detector 20 may be a long spaced detector. The SS and LS detectors are not limited to being placed on the same side of the radiation source and their spacing from the radiation source may be equal or unequal. Additional detectors may be used to provide additional radiation information. Two or more of the detectors may be gamma ray detectors. Some embodiments may include radiation shielding (not shown), which may be located between radiation source 40 and the detectors 20, 30. Radiation shielding may include, but is not limited to, gamma-ray shielding and neutron shielding. Drilling fluid 90 may be present between the formation 80 and the downhole tool 10, such that emissions from radiation source 40 may pass through drilling fluid 90 to reach formation 80 and radiation induced in the formation 80 may pass through drilling fluid 90 to reach the detectors 20, 30. In other embodiments, naturally occurring radiation may pass through drilling fluid 90 to reach the detectors 20, 30.

In one embodiment, electronics (not shown) associated with the detectors may be configured to record radiation counts from at least two axially spaced detectors 20, 30 and generate a time-dependent ratio between axially spaced detectors by using information from multiple bursts. This detection may be substantially continuous, which may be defined as occurring within very narrow time bins or windows (less than 1000 microseconds, or less than 10 microseconds). This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. In some embodiments, the time-dependent ratio may be weighted. The axially spaced detector count rate ratios may be obtained as a function of time and graphically illustrated as a time-dependent ratio curve. Various properties of the formation may be determined using the time-dependent ratio curve, including, but not limited to, porosities of the formation.

In other embodiments, such electronics may be located elsewhere (e.g., at the surface). To perform the treatments during a single trip, the tool may use a "high bandwidth" transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

One or more of the gamma ray detectors may include a scintillator component comprising a plurality of radiation responsive components which produce light scintillations in response to detecting gamma rays, and at least one light responsive device (e.g., a photomultiplier tube, other photomultiplier device, charge coupled silicon device, and so on) configured to produce an output representative of the respective light scintillations. The scintillator component may be configured so a first radiation responsive component is positioned in the available paths for gamma rays that would otherwise be incident on the second radiation responsive component. Thus no gamma rays may reach the second component without traversing the first component. "Radiation responsive" is defined as the characteristic of producing a detectable emission in response to impinging radiation such that the detected radiation is quantifiable according to the emissions. For one class of radiation responsive materials, these emissions are photons produced by scintillation. In scintillation, light is emitted as a result of the absorption of radiation, such as, for example, a gamma ray. Radiation responsive components may include scintillation material having appropriate characteristics, as described below.

Figure 3A:
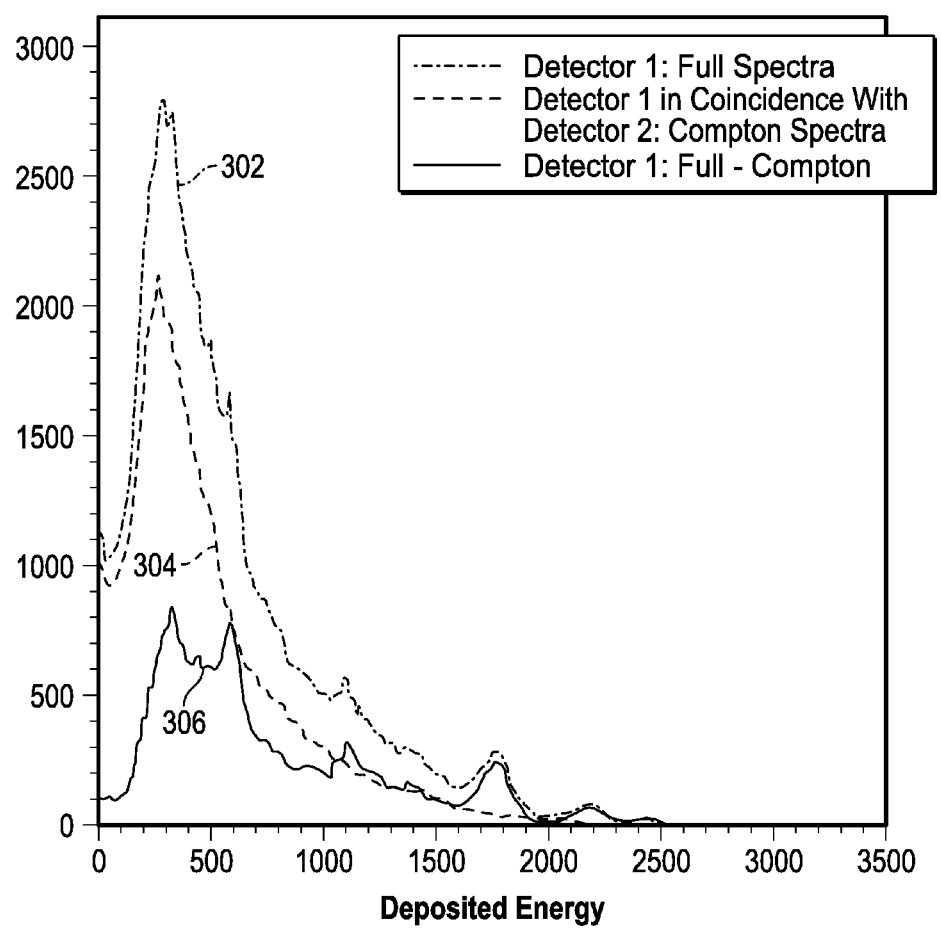
FIGS. 3A and 3B illustrate example gamma ray spectra in accordance with embodiments of the invention.
Figure 3B:
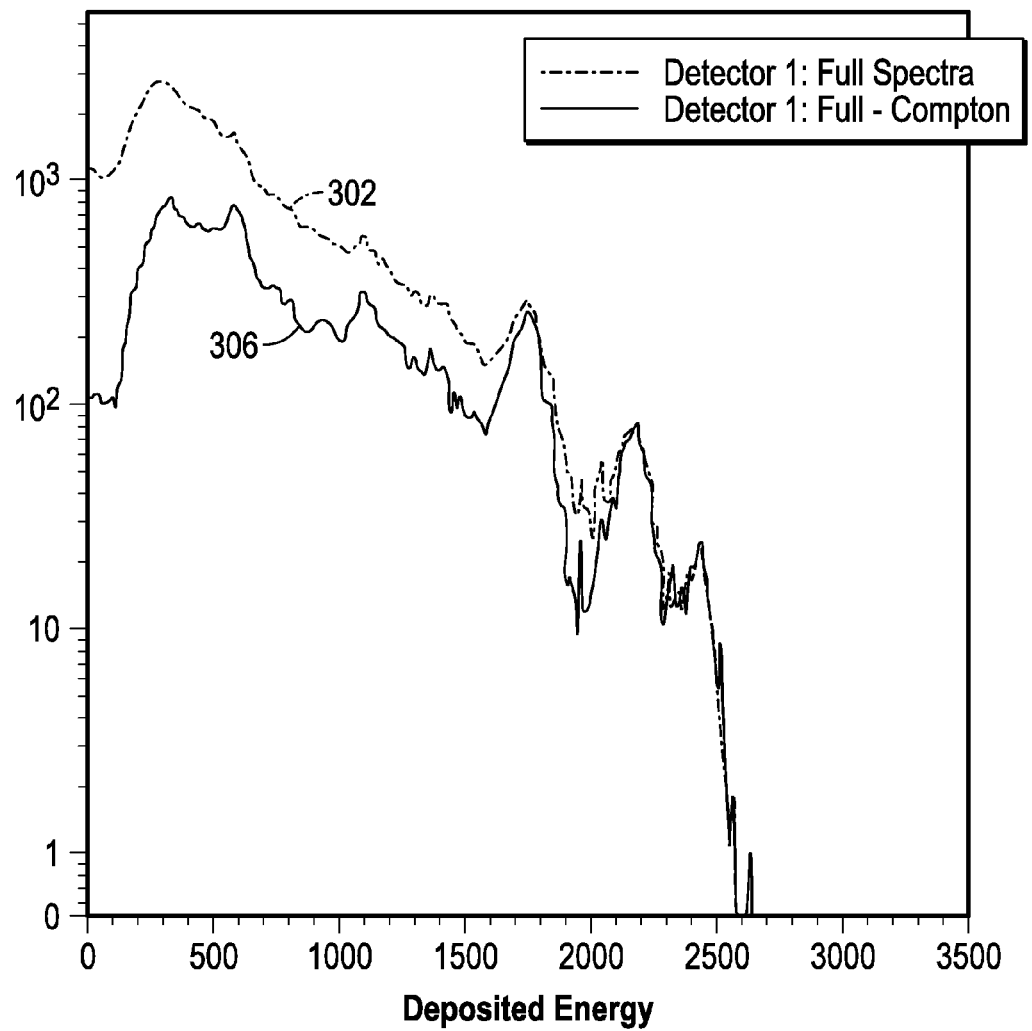

The first radiation responsive component may be configured so that, of the gamma rays it detects, a higher portion are gamma rays via Compton scattering processes. Thus, the respective materials and dimensions of the first radiation responsive component and the second radiation responsive component may be selected such that the second radiation responsive component detects gamma rays with a higher detection efficiency than the first radiation responsive component. This may be accomplished by using scintillation material with a relatively low Z and density (e.g., lower than CsI), which will have a relatively low efficiency for the photoelectric effect, which is proportional to $Z^4$. Detection produces first light scintillations indicative of the detected gamma rays, as illustrated in FIGS. 3A and 3B, and described below in further detail. The second radiation responsive component may be configured to detect gamma rays with higher photo efficiency, such as, for example, using scintillation material with relatively higher density and Z (e.g., equal to or higher than CsI).

As an example, scintillation media such as NaI(Tl) may be used for the first radiation responsive component, while the second one may use heavier scintillation media such as CsI (either in pure form, or doped with Tl or Na), BrilLanCe™ 380 (e.g., $[LaBr_3(Ce)]^1$, BGO, PreLude™, or other heavy scintillators.

In one embodiment, the first component may have density and $Z_{eff}$<=NaI(Tl), so as to detect substantially only gamma rays having a rather low energy via Compton scattering. One or more remaining radiation responsive components (second radiation responsive component) may have density and Zeff>=CsI, so as to detect conventionally detectable gamma rays via photo effect with the highest achievable probability. The second radiation responsive component may be configured to produce second light scintillations indicative of at least gamma rays that transverse the first radiation responsive component.

The radiation responsive components may be mounted at the same axial location on the carrier, so that the components are positioned along the tool string without vertical offset to one another. Thus, distinct detections of lower energy gamma rays and higher energy gamma rays may be utilized at the same formation depth with equivalent rock geometries and gamma ray paths being evaluated, such that the first radiation responsive component and the second radiation responsive component detect gamma rays at substantially the same depth along the wellbore. The formation being evaluated by each component is the same, leading to more consistent measurements between components, resulting in more accurate estimations. That is, the information more accurately represents the chemical elements or matrix of the formation being evaluated.

Figure 2B:
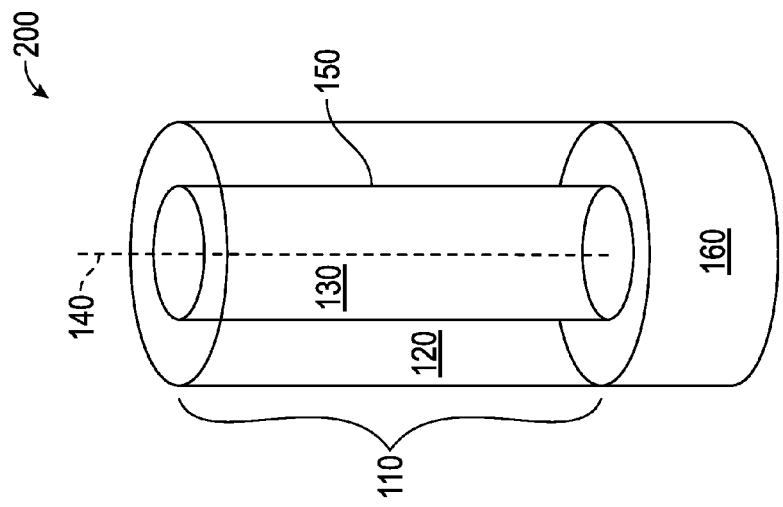
FIGS. 2A and 2B illustrate gamma ray detectors having scintillator components in accordance with embodiments of the invention.
Figure 2A:
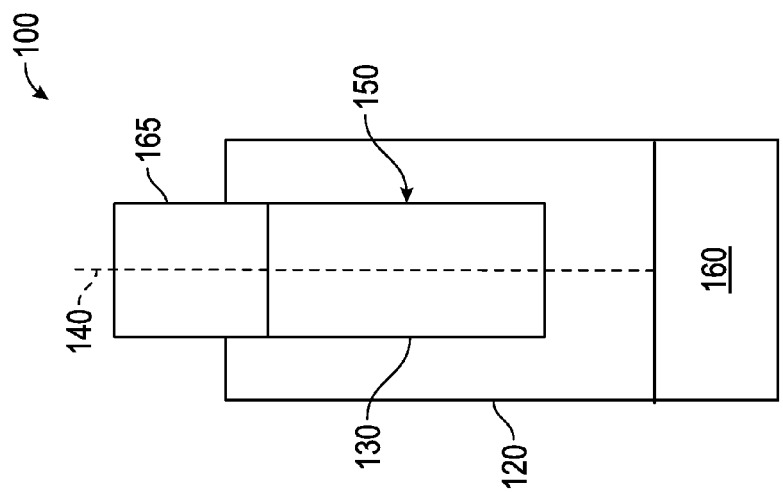

FIG. 2A illustrates a gamma ray detector 100 having a scintillator component 110 in accordance with embodiments of the invention. The scintillator component 110 includes a first radiation responsive component 120 and a second radiation responsive component 130. The scintillator component 110 further includes a first light responsive device 160 (e.g., photomultiplier tube) optically coupled to the first radiation responsive component 120 at one end, and a second light responsive device 165 (e.g., photomultiplier tube) optically coupled to the second radiation responsive component 130 at another end, such that light scintillations occurring in the components are converted to electrical signals. The second radiation responsive component 130 is disposed within the first radiation responsive component 120, and thus placed within the space surrounded by the outer component 120. The first radiation responsive component 120 comprises a cylinder with an inner well, which is shorter than the length of scintillating component 120 and may not extend all the way to light collecting device 160. In other embodiments, first radiation responsive component 120 may be implemented as a hollow cylinder circumscribing the second radiation responsive component. The first radiation responsive component 120 may include a cylindrical wall having a wall thickness providing the desired efficiency of gamma's Compton scattering and normally can be defined from Monte-Carlo simulations The first radiation responsive component 120 may be approximately concentric with the second radiation responsive component 130, and thus share the same central axis 140. The first radiation responsive component 120 and the second radiation responsive component 130 may be optically decoupled, as described below. Each component may be light-tight. The first radiation responsive component 120 may lie in contact with the second radiation responsive component 130 at a cylindrical interface 150 and may fill the cavity of the first radiation responsive component 120. As shown in FIG. 2A, the second radiation responsive component 130 is a solid cylinder. The shape of the first component 120 (e.g., a hollow cylinder) may result in reduced gamma ray count rates in comparison to a solid detector of identical diameter and length.

The scintillation component may be configured to detect gamma rays incident thereon from a set of available paths (e.g., azimuthal paths, paths within a coordinate range, etc). The first component 120 may be configured to block these available paths of travel for gamma rays from the formation to the second component 130. Additional paths of travel to the first or second component may be shielded using shielding material.

FIG. 2B illustrates a gamma ray detector 200 having a scintillator component 110 in accordance with embodiments of the invention. The scintillator component 110 further includes a light responsive device 160 (e.g., photomultiplier tube) optically coupled to the first radiation responsive component 120 and second radiation responsive component 130 at one end, such that light scintillations occurring in the components are converted to electrical signals.

Additional processing may be carried out on the output from the light responsive devices 160, 165 to determine the luminescent activity, and thus the number of gamma rays incident, on each of the first component 120 and the second component 130. The scintillation component 110 may be configured such that the output of the at least one light responsive device 160 may include a parametric difference between the first light scintillations and the second light scintillations. The parametric differences may be differences in the shapes of light signal patterns with various intensities, such as the shape of a curve reflecting the variation of signal intensity over time. The first radiation responsive component 120 and the second radiation responsive component 130 may produce scintillations of different light intensities or different response curves. For example, the response curves of signal intensities over time may vary for each radiation responsive component.

Variations in patterns may be used for analysis of "shapes" and "peaks" to attribute gamma ray counts to a specific radiation responsive component (e.g., the first radiation responsive component, the second radiation responsive component, etc.). Thus scintillations corresponding to energies below the boundary (or another defined energy level) may be attributed to the first component 120. Light nontransparent materials may be placed between either (or both) radiation responsive material and a light responsive device to alter detected variations in light patterns and thus ultimately electrical signal patterns reflecting these variations.

In some embodiments, more than two radiation responsive components may be used. One or more of the radiation responsive components may be coupled to a dedicated light responsive device, or any number of radiation responsive components may share a single light responsive device.

Referring to FIGS. 2A & 2B, the gamma ray detector 100, 200 may be adapted to prevent attributing a scintillation to a component where the scintillation did not occur. The scintillator component 110 may be configured to substantially isolate the second radiation responsive component from first light scintillations and substantially isolate the first radiation responsive component from second light scintillations using a light isolation component. The light isolation component may be implemented as one of (i) an isolator, and (ii) a treatment applied to at least one of the first radiation responsive component and the second radiation responsive component. For example, at the interface 150 between the first component 120 and the second component 130, a treatment may be applied to the surface of one or both of the components. A surface may be tinted, abraded, and/or coated to prevent the transmission of light pulses from one component to the other. The surface may also be manufactured with a feature preventing the passage of light. Additionally and/or alternatively, the scintillator component may include an isolator that is transparent to gamma rays generally interposed between the first radiation responsive component and the second radiation responsive component. Further, hardware, firmware or software solutions may be employed to identify simultaneous dual detections of light flashes by light responsive devices related to specific particles or gamma rays and attribute the scintillation to the component where it actually occurred (i.e., the component in which the gamma ray was detected). For example, this may be carried out using one or more parameters of the simultaneously detected flashes, such as intensity, duration, and so on.

Referring again to FIG. 1, in more specific embodiments, the tool 10 may be a 10 inch diameter wireline tool having a gamma ray detector as above configured to fit the tool. The length of the components may be 13 inches. The outer diameter of the crystal may be 4 inches. The tool 10 may be adapted for a borehole having specific diameters, such as, for example, approximately 10 inches. The raw signal data and/or count rates for both detectors may be recorded and/or processed separately.

As described above, methods of the present disclosure may include generating a reduced-Compton gamma ray spectrum by generating an anticoincidence gamma ray spectrum indicative of the gamma rays detected by the first radiation responsive component and the gamma rays detected by the second radiation responsive component. The anticoincidence gamma ray spectrum is indicative of those gamma rays of the gamma rays detected by the second radiation responsive component that are not detected in coincidence with the gamma rays detected by the first radiation responsive component. In some embodiments, a processor or other electronics operatively coupled to the radiation responsive components may be configured such that information (e.g., signals) indicative of detected gamma rays in the second radiation responsive component are registered for purposes of the response spectrum (e.g., measured) only if no detected gamma rays in the first radiation responsive component are coincident. That is, signals processing may be performed on the information output from the detector(s) to provide an anticoincidence signal (or other information).

In other embodiments, a processor may be configured to i) generate a full gamma ray spectrum indicative of the gamma rays detected by the second radiation responsive component; ii) generate a coincidence spectrum indicative of those gamma rays of the gamma rays detected by the second radiation responsive component that are detected in coincidence with the gamma rays detected by the first radiation responsive component; and iii) generate an anticoincidence gamma ray spectrum by subtracting the coincidence spectrum from the full spectrum.

When gamma rays that traverse the first radiation responsive component and deposit energy there (e.g., are detected) are also then registered in the second radiation responsive component, the deposited energy in the first component is due to Compton scattering. Thus, such gamma rays traveling into the second component have a reduced energy which they may deposit (partially or completely) in the second component. Energy deposited in second component from such gamma rays, even when the remaining energy is completely deposited in second component, is already less than the full energy of the original gamma ray. Thus, it does not carry information about the element from which it originated. It would not contribute to a photo-peak, but rather to the Compton continuum. This is one reason for rejecting such events from the reduced-Compton gamma ray spectrum.

Figure 4:
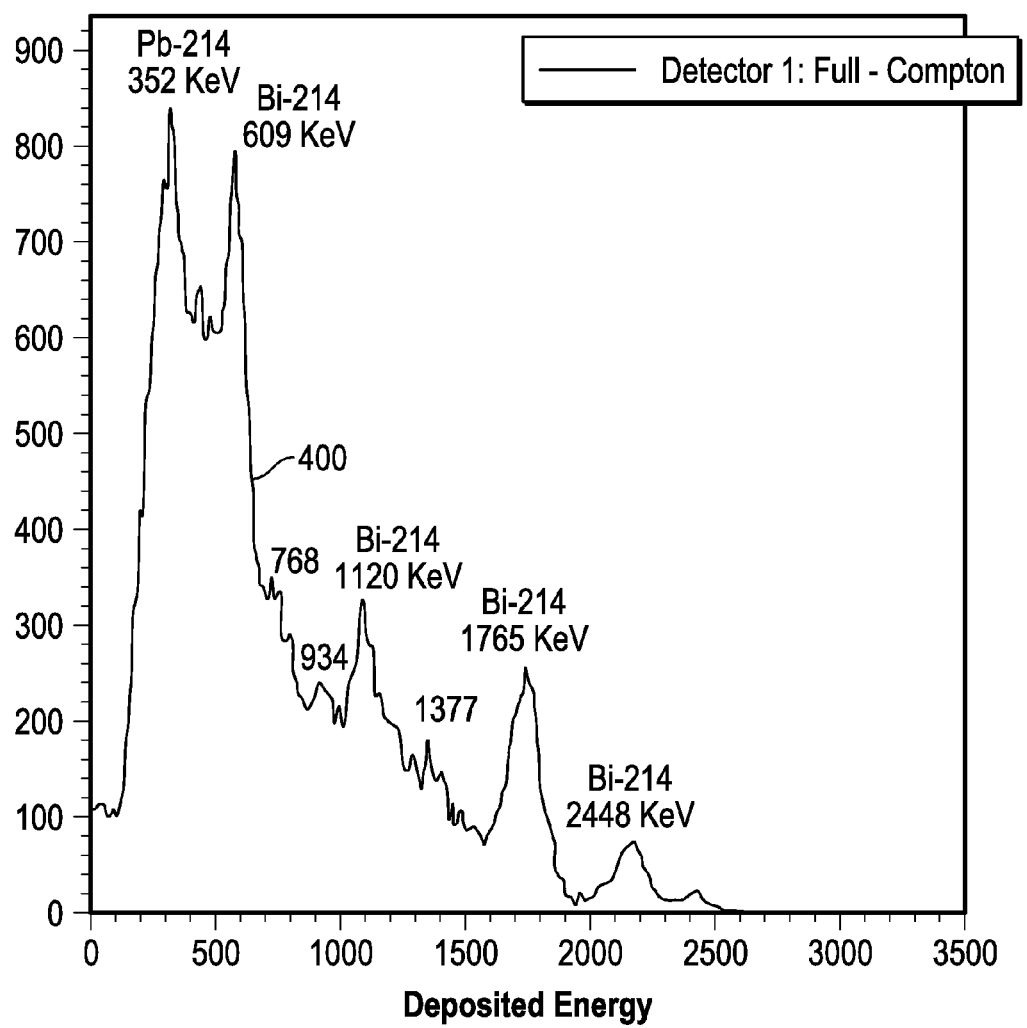
FIG. 4 illustrates an example anticoincidence gamma ray spectrum in accordance with embodiments of the invention.

FIGS. 3A and 3B illustrate example spectra in accordance with embodiments of the present disclosure. FIG. 3A illustrates a full response gamma ray spectrum representative of gamma rays detected by the second radiation responsive component, a coincidence gamma ray spectrum representative of gamma rays detected by the second radiation responsive component that are detected in coincidence with the gamma rays detected by the first radiation responsive component, and an anticoincidence gamma ray spectrum generated by subtracting the coincidence spectrum from the full spectrum. As shown in FIG. 3B, it is readily apparent that virtually no loss of accuracy occurs in the "high energy" part of the spectrum (above 1.5 MeV) from this processing. FIG. 4 illustrates anticoincidence gamma ray spectrum, used as the reduced-Compton gamma ray spectrum. Without the generation of the anticoincidence spectrum to remove Compton scattering effects as described herein, detailed decomposition of the spectrum into individual gamma peaks may not be practically accomplished.

Figure 5:
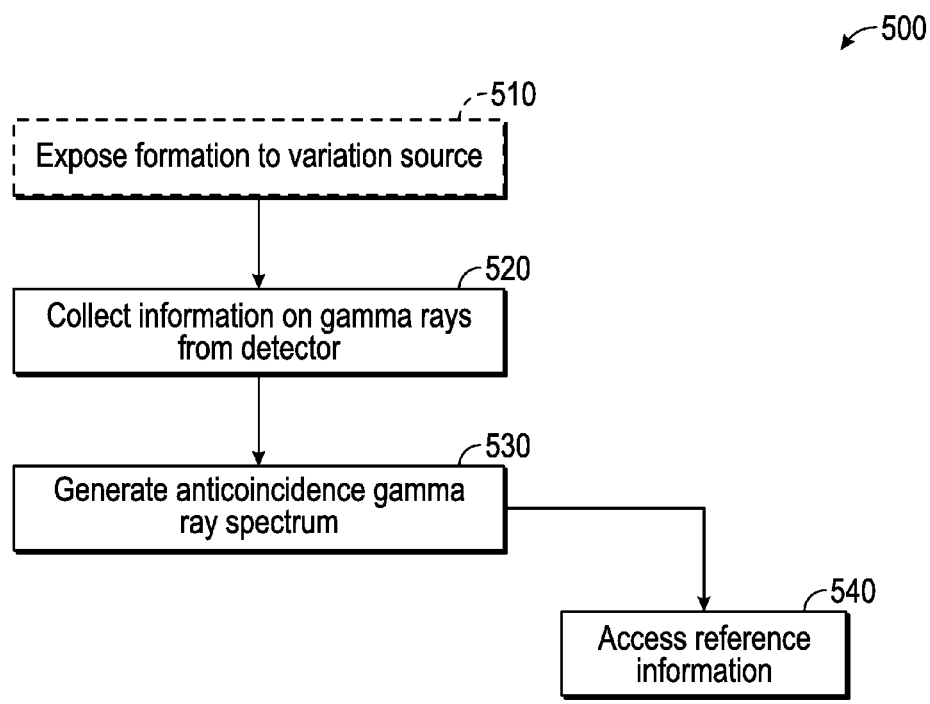
FIG. 5 illustrates methods for evaluating a parameter of interest of the formation in accordance with embodiments of the invention.

FIG. 5 shows, in flow chart form, one method 500 according to the present disclosure for evaluating a parameter of interest of the formation 80 (FIG. 1) using a model relating gamma ray information acquired from at least gamma ray detector 100 (FIG. 2) to the parameter of interest. Referring now to FIGS. 1, 2 and 5, method 500 may include optional step 510, where the radiation source 40 emits radiation in proximity to the formation 80. In step 520, information on gamma rays may be collected by one or more of detectors 20, 30, where at least one of the one or more detectors 20, 30 is a gamma ray detector 100, 200. Step 520 may be carried out by using a first radiation responsive component to detect gamma rays; and using a second radiation responsive component to detect gamma rays that traverse the first radiation responsive component. The gamma rays that traverse the first radiation responsive component may include both gamma rays that interact with (e.g., are detected by) the first radiation responsive component, indicative of Compton scattering; and gamma rays that do not interact with the first radiation responsive component.

Step 530 may include generating a reduced-Compton gamma ray spectrum by generating an anticoincidence gamma ray spectrum indicative of the gamma rays detected by the first radiation responsive component and the gamma rays detected by the second radiation responsive component. Step 530 may be carried out by i) generating a full gamma ray spectrum indicative of the gamma rays detected by the second radiation responsive component; ii) generating a coincidence spectrum indicative of those gamma rays of the gamma rays detected by the second radiation responsive component that are detected in coincidence with the gamma rays detected by the first radiation responsive component; and iii) generating the anticoincidence gamma ray spectrum by subtracting the coincidence spectrum from the full spectrum.

In some embodiments, method 500 may include step 540, where reference information on the formation or formations, or individual elements thereof (e.g., reference spectra), is accessed. Reference information may be used in conjunction with the reduced-Compton gamma ray spectrum to estimate a parameter of interest of the formation.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

As used above, the term "detect" refers to interaction in the sense of converting ionizing radiation to other detectable indicia, such as, for example, photons. As used above, the term "incident" or "incident on" refers to impinging on the physical space of or penetrating the defining boundaries of. As used above, the term "traverse" means to pass through.

Referring again to FIG. 1, certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. An apparatus for evaluating an earth formation intersected by a borehole, the apparatus comprising:
 a first radiation responsive component configured to detect gamma rays;
 a second radiation responsive component configured to detect gamma rays that traverse the first radiation responsive component, wherein the second radiation responsive component is disposed within the first radiation responsive component, and wherein the gamma rays that traverse the first radiation responsive component include at least gamma rays that interact with the first radiation component and are indicative of Compton scattering in the formation; and
 a processor configured to:
  generate a reduced-Compton gamma ray spectrum mitigating effects on the gamma ray spectrum resulting from Compton scattering in the formation by generating an anticoincidence gamma ray spectrum responsive to the gamma rays detected by the first radiation responsive component and the gamma rays detected by the second radiation responsive component, wherein the anticoincidence gamma ray spectrum is indicative of those gamma rays of the gamma rays detected by the second radiation responsive component that are not detected in coincidence with the same gamma rays detected by the first radiation responsive component, wherein those gamma rays of the gamma rays detected by the second radiation responsive component that are not detected in coincidence with the same gamma rays detected by the first radiation responsive component are indicative of Compton scattering in the formation.

2. The apparatus of claim 1, wherein the processor is further configured to:
 generate a full gamma ray spectrum indicative of the gamma rays detected by the second radiation responsive component;
 generate a coincidence spectrum indicative of those gamma rays of the gamma rays detected by the second radiation responsive component that are detected in coincidence with the same gamma rays detected by the first radiation responsive component; and
 generate the anticoincidence gamma ray spectrum by subtracting the coincidence spectrum from the full spectrum.

3. The apparatus of claim 1, wherein the first radiation responsive component is formed at least partially of a material that produces first light scintillations in response to incident gamma rays; and the second radiation responsive component is formed at least partially of a material that produces second light scintillations in response to incident gamma rays.

4. The apparatus of claim 3, further comprising a light isolation component to substantially isolate the second radiation responsive component from first light scintillations and isolate the first radiation responsive component from second light scintillations, the light isolation component comprising one of (i) an isolator, and (ii) a treatment applied to at least one of the first radiation responsive component and the second radiation responsive component.

5. The apparatus of claim 3, further comprising at least one light responsive device configured to produce an output representative of the first light scintillations and the second light scintillations.

6. The apparatus of claim 5, wherein the output of the at least one light responsive device includes a parametric difference between the first light scintillations and the second light scintillations.

7. The apparatus of claim 5, wherein the at least one light responsive device comprises a first light responsive device configured to produce an output in response to detection of the first light scintillations; and a second light responsive device configured to produce an output in response to detection of the second light scintillations.

8. The apparatus of claim 1, wherein the processor is further configured to estimate at least one parameter of interest using the reduced-Compton gamma ray spectrum.

9. The apparatus of claim 1, wherein the processor is further configured to deconvolve the reduced-Compton gamma ray spectrum into a plurality of elemental spectral yields using a plurality of standard spectra.

10. The apparatus of claim 9, wherein the reduced-Compton gamma ray spectrum spans a continuous energy range including photo peaks at characteristic energies associated with the respective ones of the plurality of standard spectra.

11. The apparatus of claim 1, wherein the at least one parameter of interest is the concentration of at least one chemical element in the formation.

12. The apparatus of claim 1, wherein the first radiation responsive component and the second radiation responsive component are configured such that the second radiation responsive component detects gamma rays with a higher detection efficiency than the first radiation responsive component.

13. The apparatus of claim 1, wherein the gamma rays are emitted from naturally occurring radionuclides.

14. A method of evaluating an earth formation intersected by a borehole, the method comprising:

using a first radiation responsive component to detect gamma rays;

using a second radiation responsive component to detect gamma rays that traverse the first radiation responsive component, wherein the second radiation responsive component is disposed within the first radiation responsive component, and wherein the gamma rays that traverse the first radiation responsive component include at least gamma rays that interact with the first radiation component and are indicative of Compton scattering in the formation;

generating a reduced-Compton gamma ray spectrum mitigating effects on the gamma ray spectrum resulting from Compton scattering in the formation by generating an anticoincidence gamma ray spectrum responsive to the gamma rays detected by the first radiation responsive component and the gamma rays detected by the second radiation responsive component, wherein the anticoincidence gamma ray spectrum is indicative of those gamma rays of the gamma rays detected by the second radiation responsive component that are not detected in coincidence with the gamma rays detected by the first radiation responsive component, wherein those gamma rays of the gamma rays detected by the second radiation responsive component that are not detected in coincidence with the same gamma rays detected by the first radiation responsive component are indicative of Compton scattering in the formation.

15. The method of claim 14, further comprising:

generating a full gamma ray spectrum indicative of the gamma rays detected by the second radiation responsive component;

generating a coincidence spectrum indicative of those gamma rays of the gamma rays detected by the second radiation responsive component that are detected in coincidence with the same gamma rays detected by the first radiation responsive component; and generating the anticoincidence gamma ray spectrum by subtracting the coincidence spectrum from the full spectrum.

16. The method of claim 14, further comprising estimating at least one parameter of interest using the reduced-Compton gamma ray spectrum.

17. The method of claim 14, further comprising deconvolving the reduced-Compton gamma ray spectrum into a plurality of elemental spectral yields using a plurality of standard spectra.

18. The method of claim 17, wherein the reduced-Compton gamma ray spectrum spans a continuous energy range including photo peaks at characteristic energies associated with the respective ones of the plurality of standard spectra.

19. A non-transitory computer-readable medium product for estimating at least one parameter of interest of a volume of an earth formation from information relating to measurements from an apparatus in a borehole of the volume including a first radiation responsive component configured to detect gamma rays and a second radiation responsive element configured to detect gamma rays that traverse the first radiation responsive element, comprising:

instructions disposed on the medium that, when executed by a processor, cause the at least one processor to:

generate a reduced-Compton gamma ray spectrum mitigating effects on the gamma ray spectrum resulting from Compton scattering in the formation by generating an anticoincidence gamma ray spectrum from information indicative of the gamma rays detected by the first radiation responsive element and the gamma rays detected by the second radiation responsive element, wherein the anticoincidence gamma ray spectrum is indicative of those gamma rays of the gamma rays detected by the second radiation responsive element that are not detected in coincidence with the same gamma rays detected by the first radiation responsive element, wherein those gamma rays of the gamma rays detected by the second radiation responsive component that are not detected in coincidence with the same gamma rays detected by the first radiation responsive component are indicative of Compton scattering in the formation, wherein the second radiation responsive component is disposed within the first radiation responsive component, and wherein the gamma rays that traverse the first radiation responsive component include at least gamma rays that interact with the first radiation component and are indicative of Compton scattering in the formation.

\* \* \* \* \*